Figure 3:
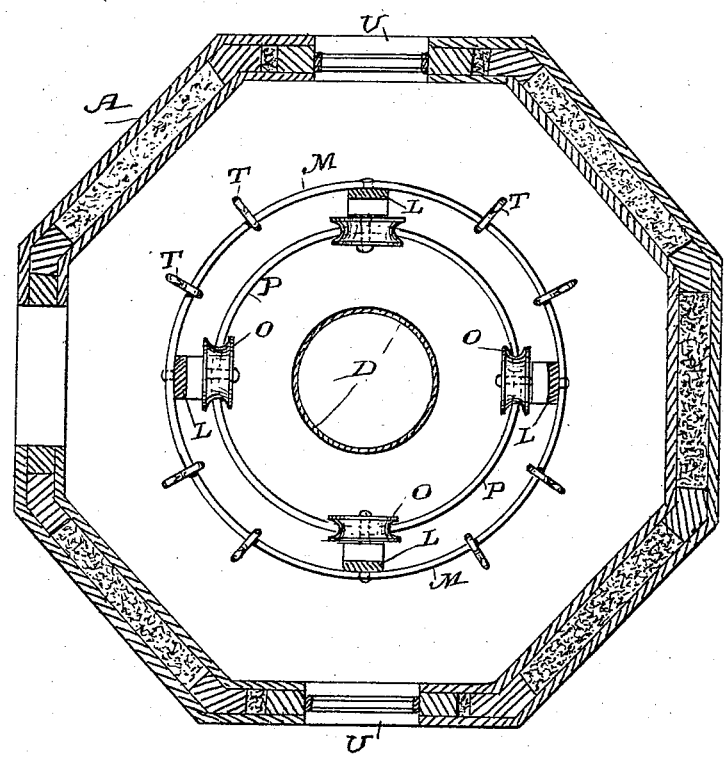

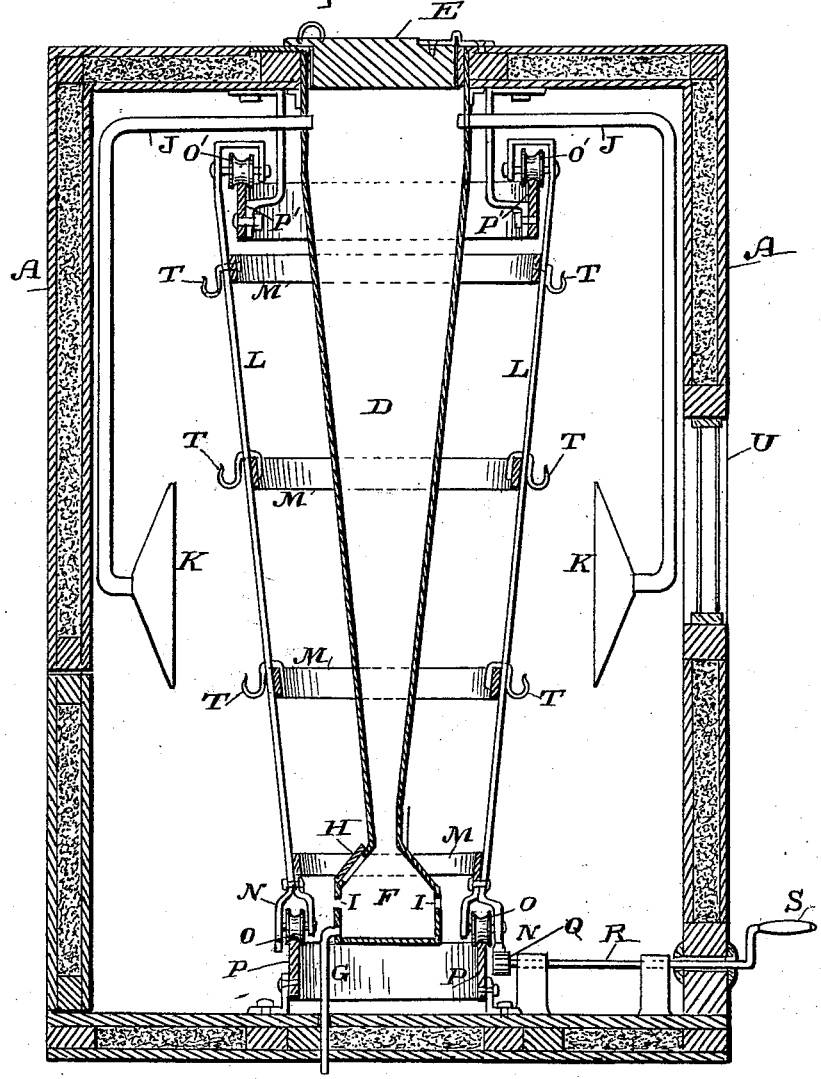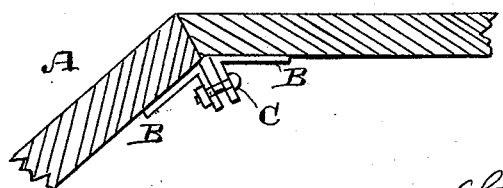

(No Model.) 2 Sheets—Sheet 2.

S. DI VECCHIO & J. MIGNOLA.
REFRIGERATOR.

No. 436,278. Patented Sept. 9, 1890.

UNITED STATES PATENT OFFICE.

STEFANO DI VECCHIO, OF SAN JOSÉ, AND JOHN MIGNOLA, OF SAN FRANCISCO, CALIFORNIA.

REFRIGERATOR.

SPECIFICATION forming part of Letters Patent No. 436,278, dated September 9, 1890.

Application filed May 13, 1890. Serial No. 351,642. (No model.)

*To all whom it may concern:*

Be it known that we, STEFANO DI VECCHIO, a citizen of the United States, residing at San José, Santa Clara county, State of California, and JOHN MIGNOLA, a citizen of the United States, residing in the city and county of San Francisco, State of California, have invented an Improvement in Refrigerators; and we hereby declare the following to be a full, clear, and exact description of the same.

Our invention relates to a refrigerating apparatus which is especially designed to preserve meats and other similar substances.

It consists of an exterior casing with the proper non-conducting filling, an interior vertical chamber for containing ice, and a surrounding movable frame-work with hooks or shelves for supporting meats or other substances, together with pipes or passages for the escape and distribution of the cold air, and details of construction, which will be more fully explained hereinafter.

Referring to the accompanying drawings for a more complete explanation of our invention, Figure 1 is a vertical section of our apparatus. Fig. 2 is a view showing the manner of joining the sides of the exterior chamber or casing. Fig. 3 is a horizontal sectional view.

A is the exterior chamber, which may be made of any suitable or desirable shape. In the present case I have shown it made as hexagonal or polygonal in form and made with double sides of wood, these sides being a sufficient distance apart to admit a filling of sawdust, charcoal, or other suitable non-conducting material. The sides are secured and drawn together by clamps B, made in the form of iron straps, secured to the inner sides and having inwardly-bent projections through which bolts C pass, and when the nuts are screwed upon the ends of these bolts they draw the sides closely together to make tight joints, at the same time rendering it easy to make any necessary alterations. Through the center of the top of this chamber is made an opening down to near the bottom of a chamber A. A suitable hinged door or cover E fits over the upper end of this chamber and is opened from time to time to admit the ice which is placed in the chamber D. In the present case I have shown this chamber conical in form and small at the lower end, with an expanded enlarged chamber F below the contracted neck, so that while the ice will be prevented from falling into this chamber on account of the contracted neck or other stop at this point the water which flows from the melting ice is received into this chamber, and is conveyed downward therefrom through the pipe G to any suitable escape or discharge.

H is a door or opening through which the interior of this chamber may be inspected and cleaned whenever desired.

I I are holes or openings in the sides of the chamber through which cold air may escape from its interior into the surrounding chamber A.

At the upper end of the ice-chamber D are openings, into which are fitted the pipes J, and these pipes lead downward along the interior sides of the chamber A and discharge cold air through the large flat funnels K, which are so placed as to discharge the air toward the center of the chamber.

Around the central chamber D is a frame-work L, which in the present case we have shown made of iron bars, with horizontal bands M at intervals between the top and bottom, to which these vertical bars L are united.

At the lower end of the frame-work L are fixed the circular bars N, having the rollers O journaled between them, and these rollers are adapted to travel upon a circular track P. The upper end of the frame-work L is also so made as to carry rollers O', which also travel upon a circular track P', so that both the upper and lower ends of this frame-work are supported so that it may be easily rotated about the central chamber.

Upon the lower edge of the circular frame-work M, I have fixed a toothed circular rack, which engages with a toothed pinion Q, this pinion being fixed upon the shaft R, which is suitably journaled within the chamber A and extends outwardly through the side of the chamber, where it is provided with a crank S, by which it and the pinion may be turned so as to rotate the frame-work L, if desired. Upon this frame-work are fixed a number of hooks T, from which meat may be suspended around the ice-chamber D and within the exterior chamber A, and shelves may also be placed within the chamber, being supported upon the rings M, or from other parts of the frame L, so as to be within close proximity of the ice-chamber D. By this construction meat or other substances may be suspended or placed in close proximity with the ice-chamber D, and the frame L may be rotated at any time to change the position of the meat, and in so doing to agitate the air within the exterior chamber A, so as to equalize the temperature throughout the chamber at all times.

U is a window made in the side of the exterior chamber A, being provided with double glass, with a space between in which a non-conducting body of air is confined. Through this window the interior of the chamber may be inspected at any time without opening the door.

Having thus described our invention, what we claim as new, and desire to secure by Letters Patent, is—

1. A refrigerator consisting of the exterior chamber having the non-conducting walls, the central conical chamber extending vertically from top to bottom of the exterior chamber, having the feed-door at the top and the expanded water-chamber at the bottom, and the air-passages I and J, opening from the bottom and top of said chamber, so as to deliver air into the exterior chamber, substantially as herein described.

2. An improved refrigerator consisting of the exterior non-conducting chamber, the interior central ice-chamber extending nearly the whole height of the exterior chamber, having the expanded water-chamber at the bottom and the openings or passages through which air may escape from the interior of the ice-box to the interior of the surrounding chamber, a frame-work having hooks or supports for material to be refrigerated, circular trucks supported within the exterior chamber, wheels journaled to the circular frame-work and traveling upon the trucks, and a mechanism whereby the frame-work may be rotated within the exterior chamber, substantially as herein described.

In witness whereof we have hereunto set our hands.

STEFANO DI VECCHIO.
JOHN MIGNOLA.

Witnesses to S. di Vecchio:
B. G. TOGNAZZI,
A. M. POLLOCK.

Witnesses to Mignola:
S. H. NOURSE,
H. C. LEE.